US006996842B2

(12) United States Patent
Strahm et al.

(10) Patent No.: US 6,996,842 B2
(45) Date of Patent: Feb. 7, 2006

(54) PROCESSING INTERNET PROTOCOL SECURITY TRAFFIC

(75) Inventors: Frederick William Strahm, Hillsboro, OR (US); Aaron R. Kunze, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 540 days.

(21) Appl. No.: 09/774,429

(22) Filed: Jan. 30, 2001

(65) Prior Publication Data

US 2002/0104020 A1 Aug. 1, 2002

(51) Int. Cl.
*H04L 9/00* (2006.01)
(52) U.S. Cl. .................. 726/13; 713/153; 713/154; 726/14
(58) Field of Classification Search ................ 713/151, 713/201, 160, 200, 153, 154; 709/245, 239, 709/230, 241, 217; 370/389, 230; 726/11, 726/13–14, 1–10, 12, 15–36
See application file for complete search history.

(56) References Cited

U.S. PATENT DOCUMENTS

| | | | | |
|---|---|---|---|---|
| 5,872,849 A | * | 2/1999 | Sudia ......................... | 713/175 |
| 6,157,955 A | * | 12/2000 | Narad et al. ................ | 709/228 |
| 6,253,321 B1 | * | 6/2001 | Nikander et al. ........... | 713/160 |
| 6,421,730 B1 | * | 7/2002 | Narad et al. ................ | 709/236 |
| 6,430,622 B1 | * | 8/2002 | Aiken, Jr. et al. .......... | 709/245 |
| 6,438,612 B1 | * | 8/2002 | Ylonen et al. .............. | 709/249 |
| 6,484,257 B1 | * | 11/2002 | Ellis ........................... | 713/153 |
| 6,505,192 B1 | * | 1/2003 | Godwin et al. ............. | 713/201 |
| 6,519,636 B2 | * | 2/2003 | Engel et al. ................ | 709/223 |
| 6,539,483 B1 | * | 3/2003 | Harrison et al. ............ | 713/201 |
| 6,578,084 B1 | * | 6/2003 | Moberg et al. ............. | 709/236 |
| 6,741,556 B1 | * | 5/2004 | Seddigh et al. ............. | 370/229 |
| 2002/0062344 A1 | * | 5/2002 | Ylonen et al. .............. | 709/204 |
| 2003/0074584 A1 | * | 4/2003 | Ellis ........................... | 713/201 |
| 2003/0191848 A1 | * | 10/2003 | Hesselink et al. .......... | 709/229 |

FOREIGN PATENT DOCUMENTS

GB 2317792 A * 4/1998

OTHER PUBLICATIONS

Sotiris Ioannidis, Angelos D. Keromytis, Steve M. Bellovin, Jonathan M. Smith, Implementing a distributed firewall, Proceedings of the 7th ACM conference on Computer and communications security, p. 190-199, Nov. 1-4, 2000, Athens, Greece.*
M. Blaze, J. Feigenbaum, J. Ioannidis, A. Keromytis. RFC 2704: The KeyNote Trust-Management System Version 2, ©1999 The Internet Society.*
Network Working Group, "Security Architecture for the Internet Protocol". http://www.ietf.org/rfc/rfc2401.txt?number=2401, Nov. 1998, accessed on Dec. 15, 2000, pp. 1-55.

(Continued)

*Primary Examiner*—Kim Vu
*Assistant Examiner*—Thomas Gyorfi
(74) *Attorney, Agent, or Firm*—Fish & Richardson P.C.

(57) ABSTRACT

Processing Internet Protocol security (IPsec) traffic includes determining at a first location if a classification parameter is available for the IPsec traffic that indicates a route for the IPsec traffic and forwarding the IPsec traffic based on the classification parameter. If a classification parameter is not available, processing IPsec traffic includes decrypting the IPsec traffic at a second location if the IPsec traffic is encrypted and determining the classification parameter for the IPsec traffic at the second location.

25 Claims, 6 Drawing Sheets

OTHER PUBLICATIONS

Molva, R. "Internet security architecture." Computer Networks, Elsevier Science Publishers B.V., Amsterdam, NL., vol. 31(8): 787-804 (1999).

Srisuresh, P. "RFC 2709—Security model with tunnel-mode IPsec for NAT domains." Internet Request for Comments (RFC 2709), Oct. 1999.

* cited by examiner

PROCESSING INTERNET PROTOCOL SECURITY TRAFFIC

BACKGROUND

This invention relates to processing Internet Protocol security traffic.

Figure 1A:
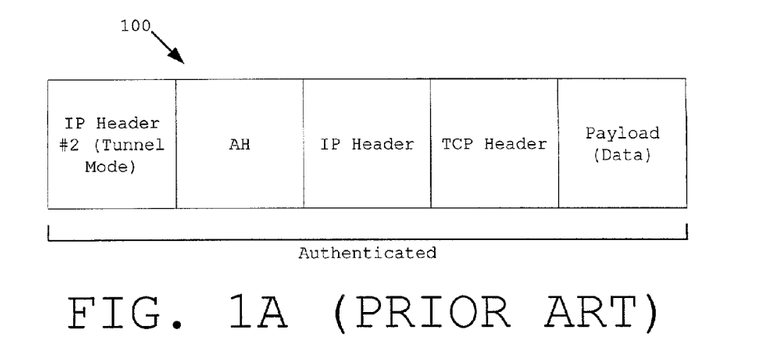
FIGS. 1A–C (PRIOR ART) are block diagrams of packets.
Figure 1B:
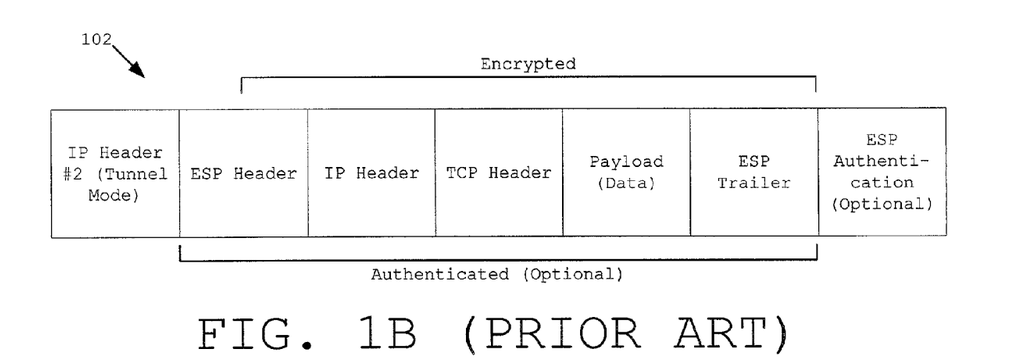
Figure 1C:
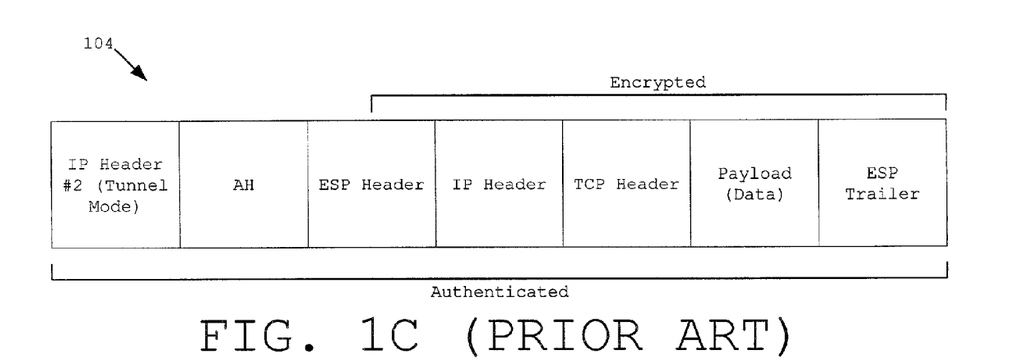

Internet Protocol security (IPsec) is a set of protocols supporting the secure transfer of packets, including packet authentication, verification, and confidentiality. Authentication and verification can be accomplished by adding an authentication header (AH) to a packet using an AH protocol, thereby authenticating the entire packet (see packet 100 in FIG. 1A). Confidentiality can be achieved by adding an encapsulating security payload (ESP) header and trailer to the packet using an ESP protocol, thereby encrypting the packet's payload (data). The ESP header can also provide for authentication and verification of the packet's payload (see packet 102 in FIG. 1B). A packet can include both AH and ESP protocols (see packet 104 in FIG. 1C). The source and the destination of an IPsec packet may each support an encryption/decryption system, such as a symmetric key encryption system, that each can use to encrypt and decrypt the IPsec packet as appropriate.

An IPsec packet can be of any traffic type: clear (no IPsec), transport only, tunnel only, multiple tunnels, and transport with one or more tunnels. In transport mode, the payload portion of the IPsec packet is encrypted. In tunnel mode, the IPsec packet's header, trailer, and payload are encrypted. An IPsec packet sent with multiple tunnels has multiple headers and trailers, each header and trailer being encrypted.

DESCRIPTION

Figure 2:
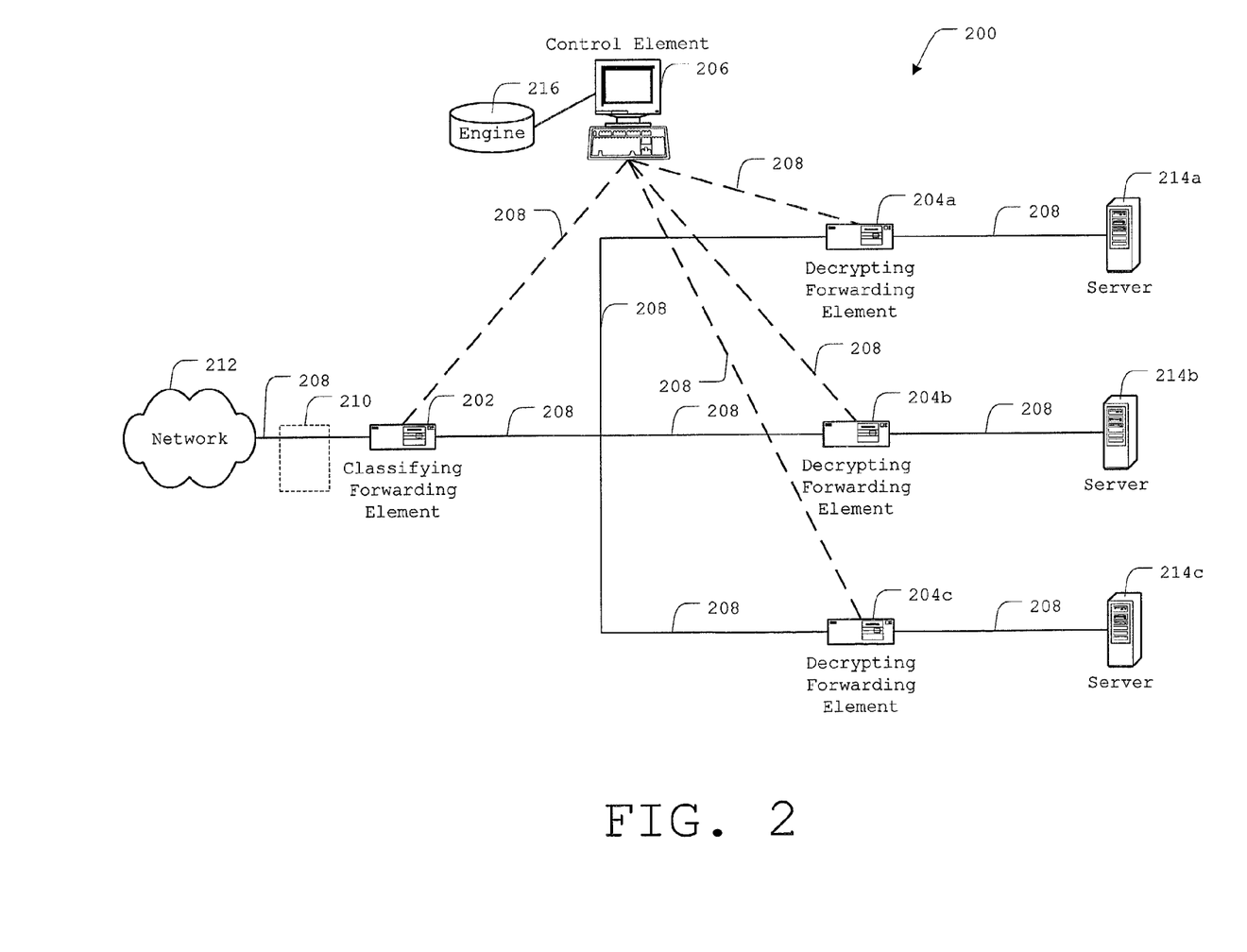
FIG. 2 is a block diagram of a network configuration.

Referring to FIG. 2, a network configuration 200 includes a classifying forwarding element (CFE) 202, decrypting forwarding elements (DFEs) 204a, 204b, and 204c, and a control element (CE) 206 that can communicate with each other using one or more communication links 208. The CFE 202, the DFEs 204a–204c, and the CE 206 can each perform various IPsec operation(s) on traffic traveling either to or from a network 212. The traffic can include a number of traffic streams, each of the traffic streams including packets, such as a packet 210 (see also, e.g., the packets 100, 102, and 104 in FIGS. 1A, 1B, and 1C, respectively). The IPsec operations can include packet dropping decision-making, packet forwarding decision-making, cryptographic operations, Internet Key Exchange (IKE) operations, and other similar operations. IPsec operations can be performed on these multiple elements and the traffic can be efficiently classified and transmitted to and/or from the network 212. Furthermore, the IPsec operations can be performed before or after making any load balancing decisions regarding a route for the traffic.

Operations of the CFE 202 include classifying the traffic it receives from the network 212 for transmission to a destination, such as a server 214a, 214b, or 214c, or from one of the servers 214a–214c for transmission to the network 212. This classifying can involve adding a header/trailer, load balancing, intrusion detection, firewalling, and other similar route optimization and security tasks. The CFE 202 classifies the traffic based on parameters sent to it by the CE 206. The parameters can include IPsec Security Parameter Index (SPI) information.

SPIs are identifiers, each uniquely associated with a security association (SA) relative to a security protocol. The source and the destination of packets transferred with IPsec need to establish an SA. An SA is a set of agreements between a packet's source and destination that determine the protocols used in transmitting the packet between the source and the destination. All traffic flowing over the same SA is treated the same by the CFE 202.

Each SA includes fields that define the characteristics of the SA. These fields can include:
 a) destination address,
 b) source address,
 c) port,
 d) protocol (traffic type),
 e) SPI,
 f) encryption/integrity algorithms and/or keys, i.e., IPsec protocol information, and
 g) duration (lifetime of SA in, e.g., kilobytes or seconds)

Each SA has an associated selector that specifies which traffic type is to be sent on the SA. Packets sent over an SA may be sent in tunnel and/or transport mode. The SA specifies the mode(s) for all packets sent over that SA. Transport mode is typically used for secure transmission of the packet from its source to its ultimate destination. Tunnel mode is typically used when the packet traverses through a gateway device such as a virtual private network (VPN) gateway or other network device that is the endpoint for the packet's security but is not the packet's ultimate destination. Packets can travel through multiple tunnels from the packet's source to its ultimate destination.

If the CFE 202 receives encrypted traffic, the CFE 202 may forward the traffic to one of the DFEs 204a–204c. The DFE 204a, for example, receives the traffic and encrypts and/or decrypts the traffic as appropriate. The DFE 204a can use any encryption/decryption system, such as a symmetric key system.

A public key encryption system uses two keys: a public key and a private key. The source of the traffic uses the public key to encrypt the traffic, while the destination uses the private key to decrypt the traffic. Examples of public key encryption systems include Diffie-Hellman (DH), Elliptic Curve Cryptography, RSA, and other similar systems. The DFE 204a may use other types of encryption/decryption systems, such a symmetric encryption system (e.g., Data Encryption Standard (DES)), a password system, and other similar systems. The DFE 204a may also use encryption acceleration hardware for performing symmetric or asymmetric key encryption.

The DFE 204a also determines if the traffic needs an IKE negotiation, in which case the DFE 204a forwards the traffic to the CE 206. The CE 206 includes (or otherwise has access to) a policy engine 216 that determines encryption/decryption parameters and classification parameters for the traffic. The encryption/decryption parameters may include cryptographic keys such as passwords, tables, or codes that the DFE 204a may need to encrypt and/or decrypt the traffic. The CE 206 forwards the determined encryption/decryption parameters to the DFE 204a. The CE 206 forwards the determined classification parameters to the CFE 202. The CE 206 may also apply policies to the traffic such as allowing or disallowing certain endpoints from participating in an IPsec exchange of some or all of the traffic.

Because the CE 206 supports the CFE 202 and the DFEs 204a–204c, the CE 206 should have security information for the servers 214a–214c, the end systems. This security information can include access tokens. In a trusted system, the CE 206 is typically not the end station for the traffic and should have at least the same security measures as the device that the CE 206 is proxying for (e.g., one of the servers 214a–214c).

The CE 206 can include any device capable of communicating with the network 212 and with the CFE 202 and the DFEs 204a–204c, such as a mobile computer, a stationary computer, a server, or other similar device. The CFE 202 and the DFEs 204a–204c can each include any device capable of communicating with the CE 206 and with each other, such as a server, a switch, a router, or similar device. The CFE 202, the DFEs 204a–204c, and the CE 206 may be layer two devices. Generally, a layer two or data link layer device forwards network traffic based on information included in the second layer of the Open Systems Interconnect (OSI) networking model. The second layer typically includes addressing information for the network traffic, including Medium Access Control (MAC) layer information.

Furthermore, the CE 206 and the DFEs 204a–204c can be included in the same physical device. In such a case, the DFE's encryption/decryption capabilities may be placed inline at the CE 206 to allow operations that could overload the DFE 204a to pass to the CE 206 for processing.

The processes executed by the CFE 202, the DFEs 204a–204c, and the CE 206 can each be accessible by its associated element, be included on its associated element (e.g., as a stand-alone application or as part of another application), or otherwise be accessible to its associated element (e.g., be included on a network accessible by its associated element).

The network 212 can include any kind and any combination of networks such as an Internet, a local network, a private network, a public network, or other similar network. The servers 214a–214b can each include any device capable of communicating with the network 212 such as a file server, a mobile computer, a stationary computer, or other similar device. The communication links can be any kind and any combination of communication links such as modem links, cables, point-to-point links, infrared connections, fiber optic links, cellular links, Bluetooth, satellite links, and other similar links.

The network configuration 200 is simplified for ease of explanation; the network configuration 200 may include additional elements such as networks, communication links, proxy servers, firewalls or other security mechanisms, Internet Service Providers (ISPs), and other elements. Additionally, the network configuration 200 can include any number of DFEs (one or more). The CE 206 can support all of the DFEs, or different CEs may support different ones of the DFEs.

Figure 3A:
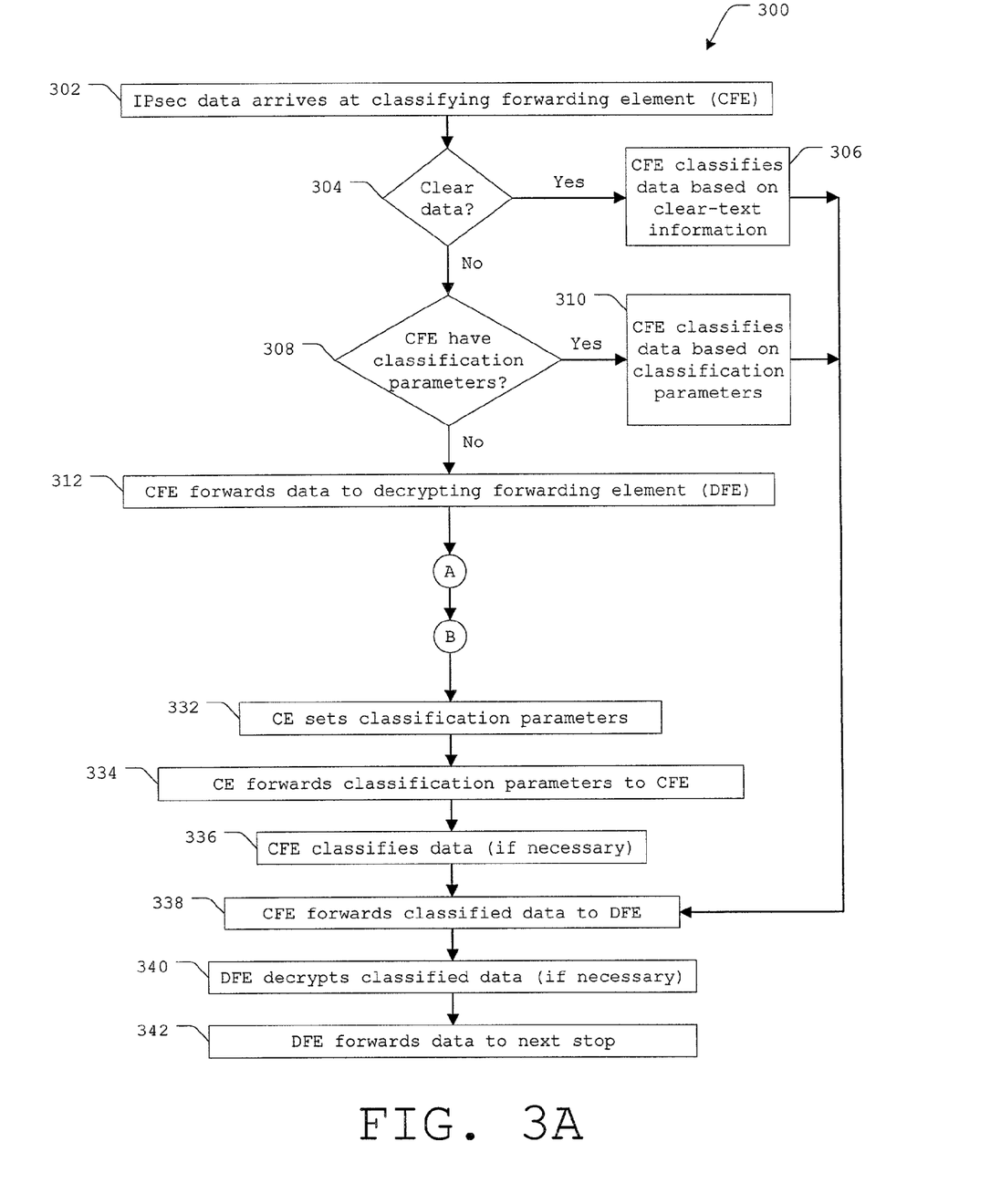
FIGS. 3a–3B are flowcharts showing a process of transmitting a packet.
Figure 3B:
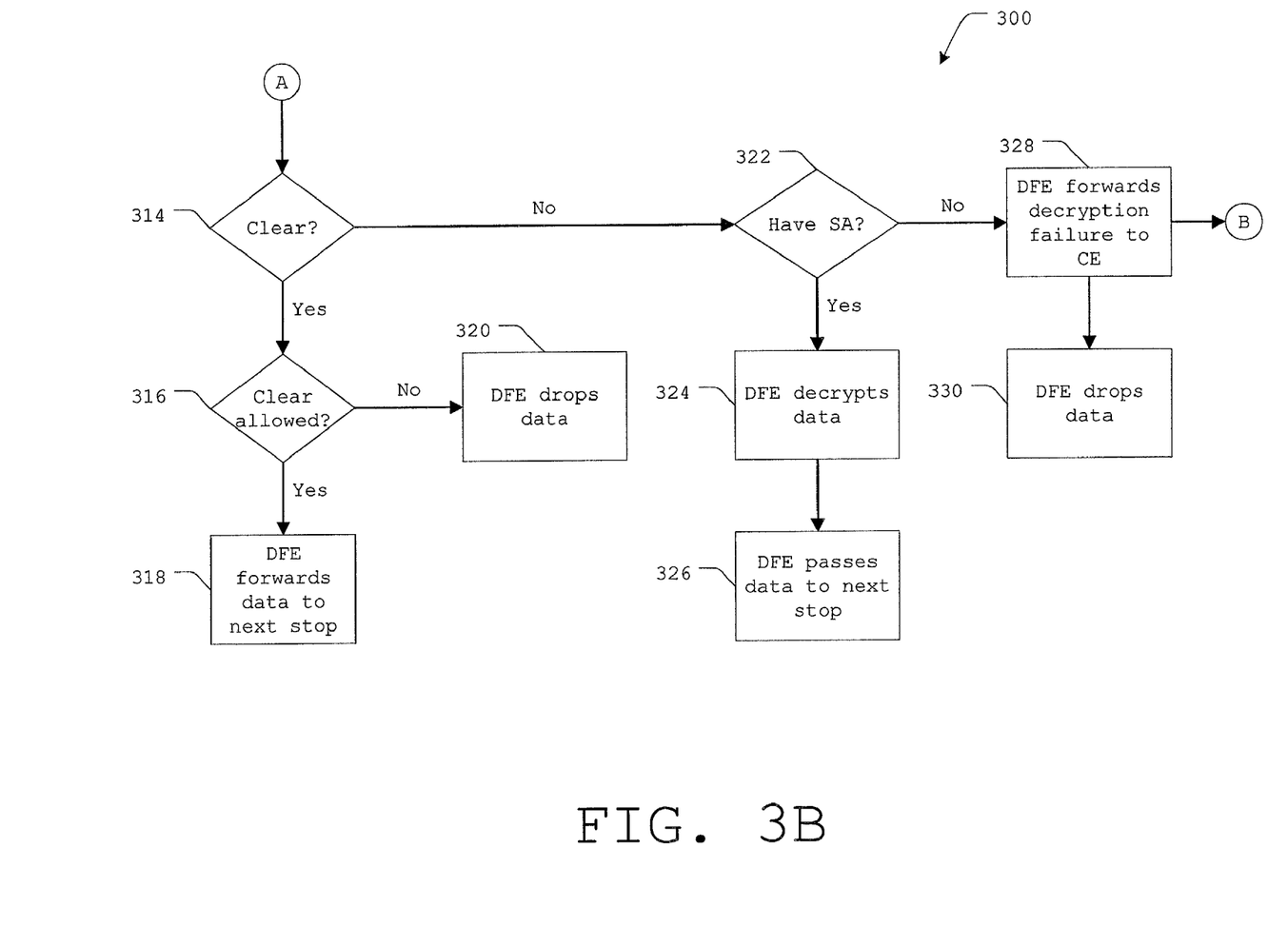

Referring to FIGS. 3A and 3B, a process 300 illustrates an example of processing the packet 210 using the CFE 202, the DFEs 204a–204c, and the CE 206. The process 300 begins when the packet 210 arrives 302 at the CFE 202. The packet 210 may have been sent from one of the servers 214a–214c or from another source that can communicate with the network 212. The CFE 202 attempts to classify the packet 210 at 302. The CFE 202 determines 304 if the packet 210 is in the clear (i.e., is not encrypted). If the packet 210 is in the clear, then the CFE 202 can access the packet's contents and appropriately classify 306 the packet 210 using clear-text or plain-text information included in the packet's contents.

Once the CFE 202 classifies the packet 210, the CFE 202 forwards 338 the classified packet 210 to one of the DFEs 204a–204c. The CFE 202 can use any selection technique to choose which DFE 204a–204c receives the packet 210. For example, the CFE 202 could implement a load balancing technique that distributes packets to the DFEs 204a–204c based on resource availability of the DFEs 204a–204c and/or the servers 214a–214c associated with the DFEs 204a–204c. In another example, the CFE 202 could implement a fixed scheme that distributed packets to the DFEs 204a–204c based on a fixed rotating order or based on a round robin scheme.

Assuming that the DFE 204a receives the packet 210 in this example, the DFE 204a decrypts 340 the packet 210 if necessary. In the case of a clear packet, decryption is not necessary. The DFE 204a then forwards 342 the clear (or decrypted) packet 210 to its next stop. The next stop is typically the server 214a associated with the DFE 204a or an element included in the network 212, although in a different network configuration, the next stop could be another server, another CFE, a network, a router, a switch, or other element.

If the packet 210 is not in the clear, then the packet 210 is encrypted. If the packet 210 is encrypted, then the CFE 202 typically cannot access any encrypted contents of the packet 210 that may help in classifying the packet 210. The CFE 202 determines 308 if it has the classification parameters necessary to classify the packet 210. If the CFE 202 has not received another packet from the same traffic stream as the packet 210, e.g., another packet sent over the same SA as the packet 210, then the CFE 202 likely does not have the classification parameters. If the CFE 202 previously received another packet from the same traffic stream, then the CFE 202 has likely already received from the CE 206 the classification parameters for that traffic stream and thus for the packet 210. Alternatively, the CFE 202 may have been preset with classification parameters for certain traffic streams. If the CFE 202 has the classification parameters, then the CFE 202 classifies 310 the packet 210 using those classification parameters. As described above, the CFE 202 forwards 338 the classified packet 210 to one of the DFEs 204a–204c, which decrypts 340 the packet 210 as appropriate and forwards 342 the packet 210 to its next stop.

If the CFE 202 does not have the classification parameters, then the CFE 202 cannot presently classify the packet 210. Thus, the CFE 202 forwards 312 the packet 210 to one of the DFEs 204a–204c.

Assuming that the DFE 204a receives the packet 210 in this example, the DFE 204a can decrypt the packet 210. Before decrypting the packet 210, however, the DFE 204a determines if an IKE negotiation needs to occur for the packet 210. (IKE negotiation is one way that security keys can be negotiated and exchanged for IPsec data. The network configuration 200, and therefore the DFEs 204a–204c and the CE 206, could be set up to use IKE or any another Internet Security Association and Key Management Protocol (ISAKMP) negotiation technique.)

The DFE 204a determines 314 if the packet 210 is in the clear. If the packet 210 is in the clear, then the DFE 204a determines 316 if packets in the clear can be accepted from the source of the packet 210. (The packet's source is typically indicated in the packet's header.) The DFE 204a may be configured to reject packets in the clear from certain sources, perhaps for a security reason such as ensuring data integrity. If packets in the clear are allowed from the packet's source, then the DFE 204*a* forwards 318 the packet 210 to its next stop. If packets in the clear are not allowed from the packet's source, then the DFE 204*a* drops 320 the packet 210. The packet 210 therefore does not reach its destination.

If the packet 210 is not in the clear, then the DFE 204*a* determines 322 if it has the correct SA for the packet 210. If so, the DFE 204*a* decrypts 324 the packet 210 using the encryption/integrity algorithms and/or keys included in the SA. The DFE 204*a* forwards 326 the now decrypted packet 210 to its next stop. If the DFE 204*a* does not have the correct SA for the packet 210, then the DFE 204*a* does not have the information necessary to decrypt the packet 210. Thus, the DFE 204*a* forwards 328 the packet 210 to the CE 206 and then drops 330 the packet 210.

The CE 206 sets 332 classification parameters for the packet 210. The CE 206 may include a particular IKE handler mechanism or other mechanism to set the classification parameters. In setting up the classification parameters, the CE 206 can use the packet's SA. In particular, the CE 206 may use the SPI included in the SA in setting the classification parameters. The SPI is typically carried in the packet's unencrypted header (and in the unencrypted headers of other packets in the packet's traffic stream). Thus, the CFE 202 can use the classification parameters and classify packets based on the SPI information included in the packets' headers, which are unencrypted and therefore readable by the CFE 202.

After setting the classification parameters, the CE 206 forwards 334 the classification parameters for the packet 210 (which are also for the SA associated with the packet 210) to the CFE 202. The CFE 202 stores or otherwise retains the classification parameters for use in classifying the packet 210 and other packets having the same SA as the packet 210.

If the packet 210 still needs to be classified, the CFE 202 classifies 336 the packet 210. The packet 210 may still need classification if, for example, the CFE 202 received the packet 210 back from the DFE 204*a* or the CE 202. In another example, the CFE 202 may have forwarded a copy of the packet 210 to the DFE 204*a* in which case the CFE 202 still has the unclassified packet 210. The packet 210 may not need classification by the CFE 202 for a variety of reasons. For example, another element may have performed the classification, e.g., the DFE 204*a* may have kept the packet 210 (or the DFE 204*a* may be included in the CE 206), the CE 206 may have provided the DFE 204*a* with the classification parameters for the packet 210, and the DFE 204*a* may have classified the packet 210 (and decrypted and forwarded the packet 210 as appropriate). In another example, if the CFE 202 cannot classify the packet 210 when it first receives the packet 210, the packet 210 may be dropped and not delivered to its destination, even if classification parameters for the packet 210 are eventually set by the CE 206. If the CFE 202 classifies the packet 210, the CFE 202, as described above, forwards the packet 210 to the DFE 204*a*, which decrypts the packet 210 as appropriate and forwards the packet 210 to its next stop.

Figure 4:
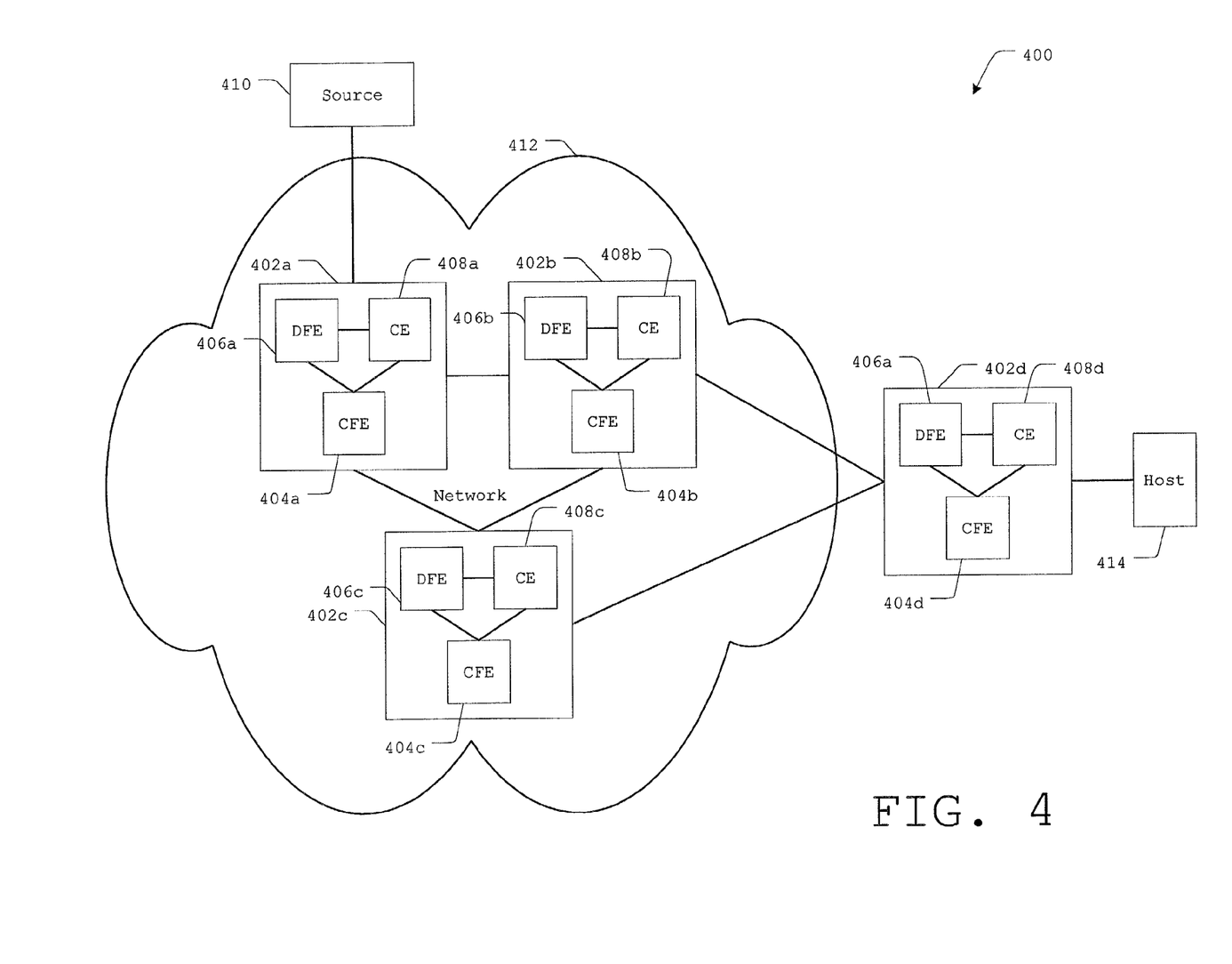
FIGS. 4–5 are block diagrams of network configurations.

Referring to FIG. 4, a network configuration 400 illustrates routing elements 402*a*, 402*b*, 402*c*, and 402*d* each including a CFE 404, a DFE 406, and a CE 408. A source 410 sends a traffic stream across a network 412 to a host destination 414. The traffic stream encounters the first routing element 402*a*, where the first CFE 404*a* classifies the traffic stream. The first DFE 406*a* and the first CE 408*a* also process the traffic stream if necessary. The traffic stream passes from the first routing element 402*a* either to the second routing element 402*b* or to the third routing element 402*c*. Based on routing decisions made at the first routing element 402*a*, parts (packets) of the traffic stream may pass to different ones of the routing elements 402*b* and 402*c* on its way to the destination 414. The traffic stream reaches the fourth routing element 402*d*, which passes the traffic stream to the destination 414.

Like the network configuration 200 of FIG. 2, the network configuration 400 is simplified and may include additional elements. Similarly, the elements included in the network configuration 400 can be implemented as described above (and below).

Figure 5:
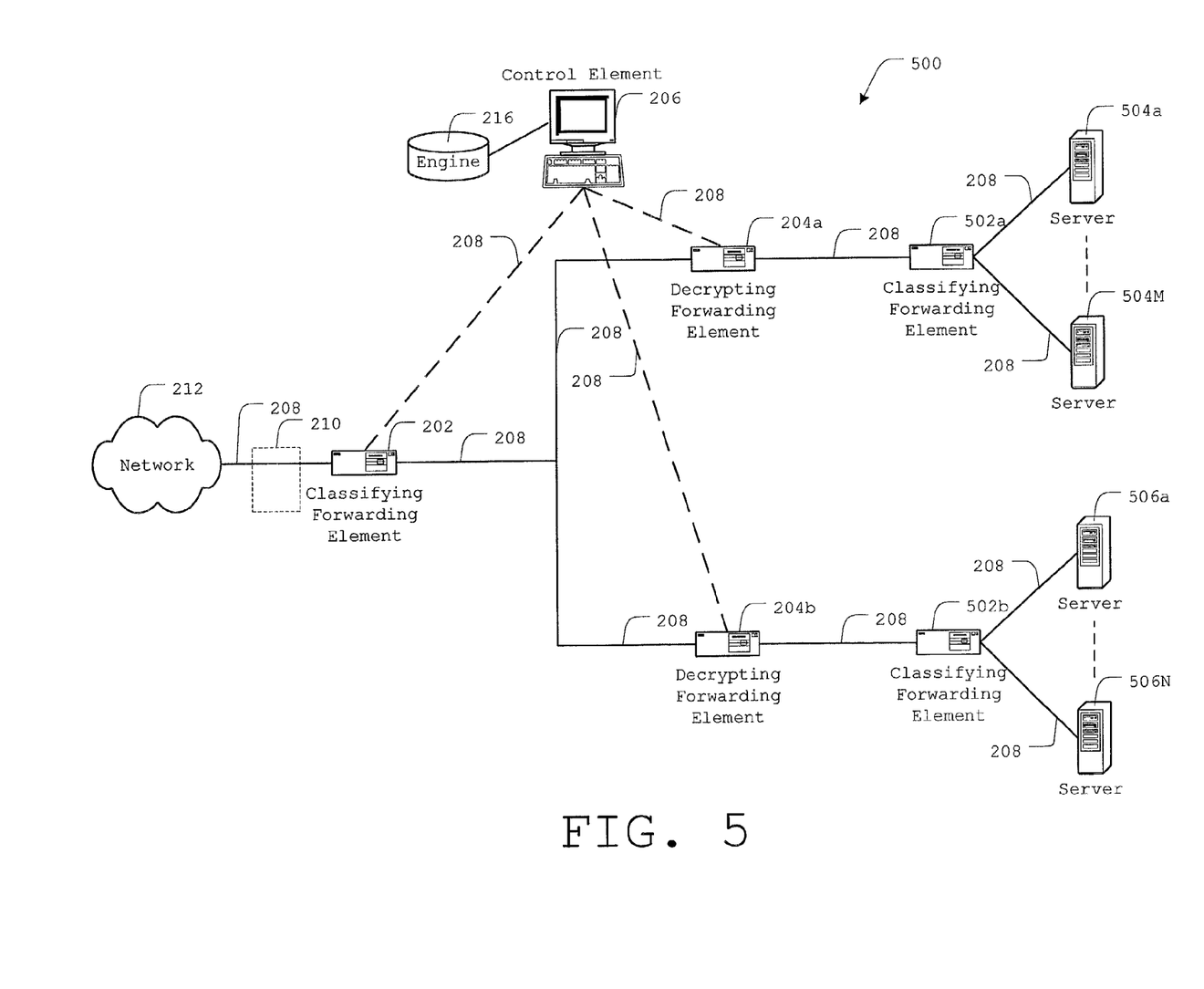

Referring to FIG. 5, an alternate network configuration 500 has a setup and operation similar to the network configuration 200 described above but includes an additional CFE 502 in-between each DFE 204 and server 504*a*–M and 506*a*–N. The alternate network configuration 500 illustrates the scenario in which one of multiple servers, e.g., the servers 504*a*–M or the servers 504*a*–504N, behind a DFE 204 could be the ultimate destination of the packet 210. The CFEs 502 are similar to the CFE 202 and the servers 504 and 506 are similar to the servers 214.

In an example of how the packet 210 may be processed in the alternate network configuration 500, the CFE 202 receives the packets 210, classifies the packet 210, and forwards the classified packet to one of the DFEs 204*a*–204*b*. The DFE 204 that receives the packet 210 decrypts the packet 210 if necessary and forwards the clear or decrypted packet 210 to its associated CFE 502. The CFE 502 that receives the packet 210 forwards the packet 210 to one of its associated servers 504 or 506. As explained above for the CFE 202, the CFE 502 can use any selection technique to choose which server 504 or 506 should receive the packet 210. Alternatively, the packet 210 may specify which server 504 or 506 it should be forwarded to by the CFE 502.

The techniques described here are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, and similar devices that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program may be implemented in a high level procedural or object oriented programming language to communicate with a machine system. However, the programs can be implemented in assembly or machine language, if desired. In any case, the language may be a compiled or interpreted language.

Each such program may be stored on a storage medium or device, e.g., compact disc read only memory (CD-ROM), hard disk, magnetic diskette, or similar medium or device, that is readable by a general or special purpose programmable machine for configuring and operating the machine when the storage medium or device is read by the computer to perform the procedures described in this document. The system may also be considered to be implemented as a machine-readable storage medium, configured with a program, where the storage medium so configured causes a machine to operate in a specific and predefined manner.

Other embodiments are within the scope of the following claims.

What is claimed is:

1. A method comprising:
determining at a first classifying forwarding element if a classification parameter is available for Internet Protocol security (IPsec) traffic that indicates a route for the IPsec traffic and classifying said traffic if available;
if said classification parameter is not available, and the IPsec traffic is encrypted then decrypting traffic in a decrypting forwarding element separate from the first classifying forwarding element after said traffic has passed through said classifying forwarding element, and determining the classification parameter for the IPsec traffic;
forwarding the IPsec traffic based on the classification parameter; and
providing the classification parameter to the first classifying forwarding element.

2. The method of claim 1 further comprising receiving the IPsec traffic at the classifying forwarding element.

3. The method of claim 1 in which the classification parameter includes a security parameter index (SPI) associated with the IPsec traffic.

4. The method of claim 1 in which the IPsec traffic includes a data packet.

5. The method of claim 1 further comprising receiving at the first classifying forwarding element other IPsec traffic included in a traffic stream with the IPsec traffic, and further comprising forwarding the other IPsec traffic based on the provided classification parameter.

6. An article comprising:
a machine-readable medium which stores machine-executable instructions, the instructions causing a machine to:
determine at a first mechanism if a classification parameter is available for Internet Protocol security (IPsec) traffic that indicates a route for the IPsec traffic;
if a classification parameter is not available, sending said traffic to a second mechanism separate from the first mechanism after said traffic has passed said first mechanism, and which second mechanism decrypts the IPsec traffic if the IPsec traffic is encrypted and determine the classification parameter for the IPsec traffic
forward the IPsec traffic based on the classification parameter; and
provide the classification parameter to the first mechanism.

7. The article of claim 6 further causing a machine to receive the IPsec traffic at the first mechanism.

8. The article of claim 6 in which the classification parameter includes a security parameter index (SPI) associated with the IPsec traffic.

9. The article of claim 6 in which the IPsec traffic includes a data packet.

10. The article of claim 6 further causing the first mechanism to forward other IPsec traffic included in a traffic stream with the IPsec traffic based on the provided classification parameter.

11. A system comprising:
a classifying forwarding element configured to communicate with a network, to determine if a classification parameter that indicates a route for a traffic stream is available for a packet included in the traffic stream;
a control element in communication with the classifying forwarding element, the control element configured to receive information including classification information for the traffic stream and cryptographic information for the traffic stream, the control element further configured to transmit at least some classification information to the classifying forwarding element and to transmit at least one key based on the cryptographic information to a decrypting forwarding element separate from the classifying forwarding element; and
wherein the decrypting forwarding element is configured to receive the packet from the classifying forwarding element, and to perform an encryption-related procedure on the packet if the packet is encrypted and associated with the at least one key.

12. The system of claim 11 wherein the control element is configured to receive at least some of the cryptographic information in an Internet Key Exchange packet.

13. The system of claim 12 in which the decrypting forwarding element is also configured to forward the packet to the control element if the packet is not associated with a known encryption-related key.

14. The system of claim 12, wherein the decrypting forwarding element is included in a plurality of decrypting forwarding elements, each in communication with at least one server of a plurality of servers, and wherein the control element includes security information for each of the plurality of servers.

15. The system of claim 12, wherein the cryptographic information includes an encryption-related key.

16. The system of claim 11 further comprising a plurality of additional mechanisms, each additional mechanism configured to communicate with the classifying forwarding element to perform an encryption-related procedure on the packet if the packet is encrypted and associated with a known encryption-related key, and, if the classification parameter is available, to forward the packet based on the route for the traffic stream.

17. The system of claim 11 in which the packet includes an Internet Protocol security data packet.

18. The system of claim 11 in which the traffic stream includes a plurality of Internet Protocol security data packets.

19. The system of claim 11 in which the classifying forwarding element is also configured to forward the packet to the decrypting forwarding element if the packet is encrypted.

20. The system of claim 11 in which the route for the traffic stream includes a route through a network.

21. The system of claim 20 in which the network includes an Internet.

22. The system of claim 11 in which the encryption-related procedure includes encrypting the packet.

23. The system of claim 11 in which the encryption-related procedure includes decrypting the packet.

24. The system of claim 11 further comprising another mechanism configured to receive the packet from the decrypting forwarding element and to forward the packet based on the route to an ultimate destination of the packet.

25. The system of claim 11 in which the classifying forwarding element is also configured to route packets included in the traffic stream based on a load balancing scheme.

* * * * *